(12) United States Patent
Yamada et al.

(10) Patent No.: US 7,679,769 B2
(45) Date of Patent: Mar. 16, 2010

(54) DATA RECEIVING SYSTEM AND DATA OUTPUT METHOD THEREFOR, DATA RECEIVING APPARATUS, AND CONTROL PROGRAM FOR IMPLEMENTING THE DATA OUTPUT METHOD

(75) Inventors: Naoto Yamada, Kawasaki (JP); Ryuta Mine, Toride (JP); Manabu Yamauchi, Kashiwa (JP); Hideyuki Ikegami, Abiko (JP)

(73) Assignee: Canon Kabushiki Kaisha (JP)

( * ) Notice: Subject to any disclaimer, the term of this patent is extended or adjusted under 35 U.S.C. 154(b) by 988 days.

(21) Appl. No.: 11/369,224

(22) Filed: Mar. 6, 2006

(65) Prior Publication Data
US 2006/0253610 A1 Nov. 9, 2006

(30) Foreign Application Priority Data
Mar. 7, 2005 (JP) .............................. 2005-062522

(51) Int. Cl.
*G06F 15/00* (2006.01)
*G06F 15/16* (2006.01)

(52) U.S. Cl. ..................................... 358/1.15; 709/206

(58) Field of Classification Search ................ 358/1.15, 358/1.14, 1.13, 1.16, 1.18, 400, 403, 407; 709/200, 206, 245, 220, 249, 227; 707/9, 707/10; 705/1, 26, 27, 58; 712/236, 228, 712/248, 218, 244; 715/273
See application file for complete search history.

(56) References Cited

U.S. PATENT DOCUMENTS

RE40,454 E * 8/2008 Nickerson .................... 358/468
2007/0076253 A1 * 4/2007 Shima ........................ 358/1.15

FOREIGN PATENT DOCUMENTS

| JP | 06-225062 A | 8/1994 |
|----|-------------|--------|
| JP | 2000-201267 A | 7/2000 |
| JP | 2004-015401 A | 1/2004 |

* cited by examiner

*Primary Examiner*—Saeid Ebrahimi Dehkordy
(74) *Attorney, Agent, or Firm*—Rossi, Kimms & McDowell, LLP

(57) ABSTRACT

A data receiving system which enables, even when the location of a recipient is changed, a sender to always send data to the same transmission destination, and the recipient to obtain received data from a nearest output terminal apparatus. A server as the data receiving apparatus receives data addressed to an IP address, as received data through the Internet. A multi-function peripheral as an output terminal apparatus receives the received data from the server and outputs the same. In this case, the server selects the multi-function peripheral from registered multi-function peripherals based on the IP address to which the received data is addressed, and relationship map information, and then transfers the received data to the selected multi-function peripheral.

11 Claims, 16 Drawing Sheets

FIG. 7

| YOUR IP ADDRESS | fe08 : : 1 | | |
|---|---|---|---|
| REGISTRATION SCREEN | SET CONDITION FILTERS AND OUTPUT APPARATUS | | |

| | PRIORITY | PRINTING COLOR FILTER | RESOLUTION FILTER | RECORDING/PRINTOUT TERMINAL IDENTIFICATION CODE | |
|---|---|---|---|---|---|
| RECORDING/ PRINTOUT TERMINAL 1 | | FULL COLOR ▶ and | ~400dpi ▶ | mfp131:cl:400 | REFERENCE |
| RECORDING/ PRINTOUT TERMINAL 2 | | MONOCHROME ▶ and | ~400dpi ▶ | mfp132:Bk:400 | REFERENCE |
| RECORDING/ PRINTOUT TERMINAL 3 | | FULL COLOR ▶ and | 400dpi~ ▶ | mfp133:cl:1200 | REFERENCE |
| RECORDING/ PRINTOUT TERMINAL 4 | | MONOCHROME / FULL COLOR / OTHER | 400dpi~ ▶ | mfp134:Bk:1200 | REFERENCE |

OTHER SETTINGS

ADDITION OF RECORDING/PRINTOUT TERMINAL

UPDATE    CANCEL

FIG. 8

RECIPIENT'S IP ADDRESS   fe08::1

REGISTERED RECORDING/PRINTOUT TERMINALS

| IMAGE FORMAT CONDITION | RECORDING/PRINTOUT TERMINAL IDENTIFICATION CODE | |
|---|---|---|
| MONOCHROME ~400dpi | > mfp132:Bk:400 | (IDENTIFICATION CODE FOR MULTI-FUNCTION PERIPHERAL 132) |
| COLOR ~400dpi | > mfp131:cl:400 | (IDENTIFICATION CODE FOR MULTI-FUNCTION PERIPHERAL 131) |
| MONOCHROME 400dpi~ | > mfp134:Bk:1200 | (IDENTIFICATION CODE FOR MULTI-FUNCTION PERIPHERAL 134) |
| COLOR 400dpi~ | > mfp133:cl:1200 | (IDENTIFICATION CODE FOR MULTI-FUNCTION PERIPHERAL 133) |

FIG. 11

RECIPIENT'S IP ADDRESS  fe08 : : 1

REGISTERED RECORDING/PRINTOUT TERMINALS

| | IDENTIFICATION CODE | IMAGE FORMAT CONDITION | | OPERATING STATUS |
|---|---|---|---|---|
| MULTI-FUNCTION PERIPHERAL 132 | mfp132:Bk:400 | MONOCHROME: ~400dpi | > | STANDBY |
| MULTI-FUNCTION PERIPHERAL 131 | mfp131:cl:400 | COLOR: ~400dpi | > | DURING JOB EXECUTION |
| MULTI-FUNCTION PERIPHERAL 134 | mfp134:Bk:1200 | MONOCHROME: 400dpi~ | > | OFF |
| MULTI-FUNCTION PERIPHERAL 133 | mfp133:cl:1200 | COLOR: 400dpi~ | > | STANDBY |

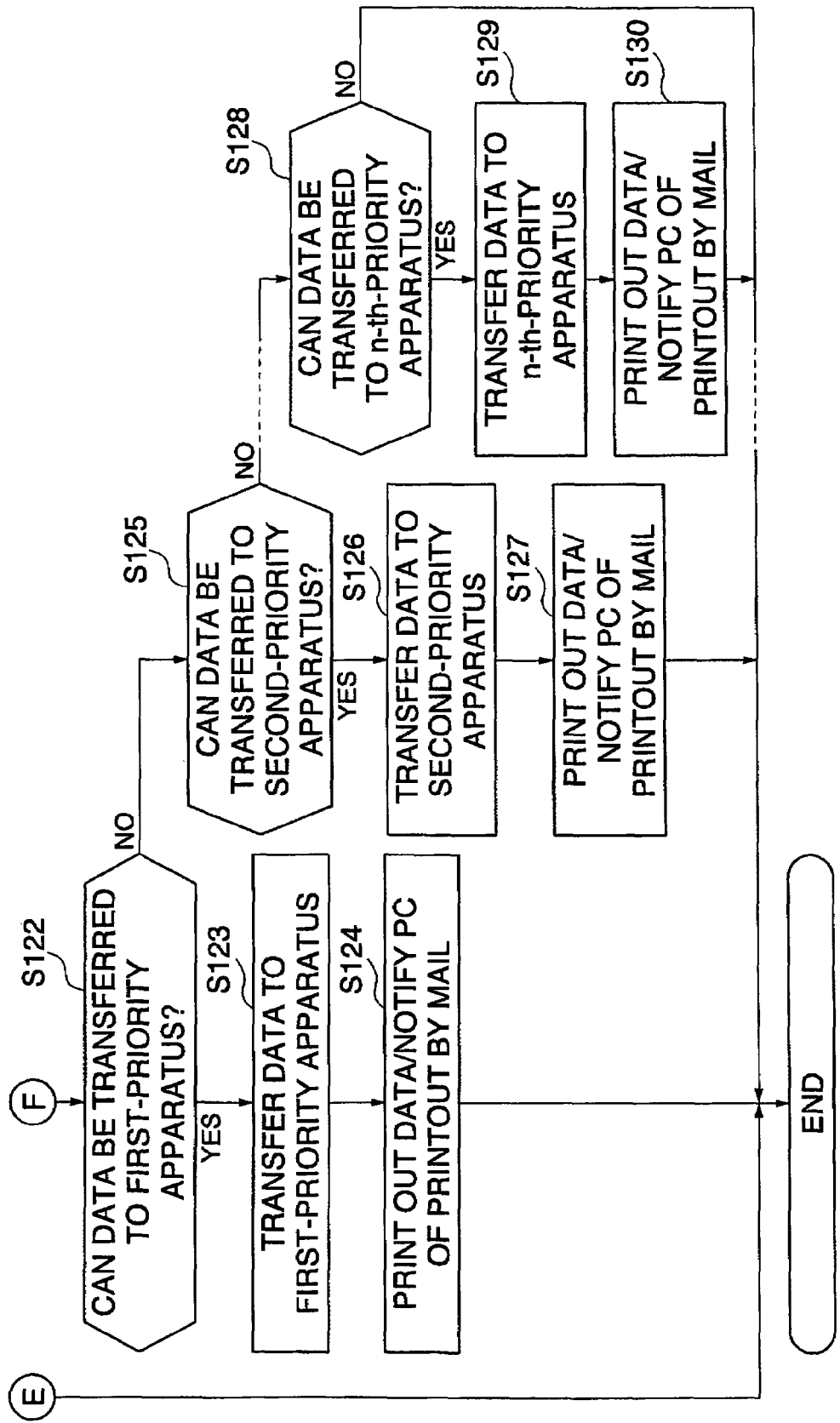

DATA RECEIVING SYSTEM AND DATA OUTPUT METHOD THEREFOR, DATA RECEIVING APPARATUS, AND CONTROL PROGRAM FOR IMPLEMENTING THE DATA OUTPUT METHOD

BACKGROUND OF THE INVENTION

1. Field of the Invention

The present invention relates to a data receiving system for receiving data through a communication network and a data output method therefor, a data receiving apparatus, and a control program for implementing the data output method.

2. Description of the Related Art

Facsimile terminals capable of reading characters or graphics printed in an original, as image information, and sending the image information to a specific destination terminal have been widely used in offices and homes. A conventional facsimile terminal has a transmitter/receiver section and a printer integrated with the transmitter/receiver section. A sender enters a fax number of a transmission destination in the facsimile terminal to thereby send image information to a facsimile terminal on a receiving end, and the receiving-end facsimile terminal outputs the received image information by a printer incorporated therein.

In general, a facsimile terminal of the above-mentioned type is shared by a plurality of users in an office or the like. For this reason, whenever facsimile reception occurs, it is required to check which of the facsimile users the received facsimile is addressed to. To avoid this troublesome operation, there has conventionally been proposed a technique of outputting a facsimile receipt notification to a telephone of a recipient as a destination for a received facsimile upon receipt of the facsimile (e.g. in Japanese Laid-Open Patent Publications (Kokai) No. H06-225062 (Japanese Patent No. 2732766) and No. 2000-201267).

In Japanese Laid-Open Patent Publication No. H06-225062 (Japanese Patent No. 2732766), telephone numbers of respective provisional senders are each stored in advance in a manner associated with a user code for a facsimile terminal. When a facsimile is received, the telephone number of the sender is detected, and it is determined whether or not there is a match between the detected telephone number of the sender and any one of the stored telephone numbers of the provisional senders. Then, if the detected telephone number matches a provisional sender's telephone number, a voice notification message is output to a user associated with the provisional sender's telephone number through a speaker, a private branch telephone system, or a personal computer terminal.

Further, Japanese Laid-Open Patent Publication No. 2000-201267 discloses a facsimile apparatus provided with a telephone number table storing recipients' individual numbers in association with telephone numbers. According to this apparatus, a recipient's individual number is extracted from a DTMF signal received when receiving a facsimile, and a telephone number associated with the extracted recipient's individual number is acquired from the telephone number table. Then, a receipt notification by voice to the effect that the facsimile has been received is transmitted to a telephone associated with the acquired telephone number.

However, the above described conventional techniques suffer from the following problems:

(1) Even when a recipient receives a receipt notification upon receipt of a facsimile, the recipient cannot always output a received copy from a nearest facsimile terminal. For example, assuming that the reallocation of personnel within an office shifts a facsimile user to a place far away from a facsimile terminal always used by the facsimile user so far, the facsimile terminal prints out a received copy as ever, so that he/she has to go to the facsimile terminal remote from him so as to receive the printed copy. In such cases, in order for a facsimile user to obtain a printed copy from a nearest facsimile terminal, it is necessary to notify all possible senders including business partners of a facsimile number of the nearest facsimile terminal whenever he/she is shifted to a new place.

(2) When a receiving terminal is a multi-function peripheral having not only the facsimile function, but also other functions including the printer function and the copier function, a facsimile can arrive during execution of a job not by the facsimile function, but by another function, such as the printer function or the copier function. In this case, a user using the multi-function peripheral as a facsimile terminal cannot obtain a received copy until the current job is completed.

(3) In the case where a sender is not informed of the recording/printout capabilities of a destination terminal, if the sender sends data with a high resolution containing a large amount of information to the terminal at the receiving end, the data might be converted into low-resolution data, due to the recording/printout capabilities of the receiving-end terminal, to reduce the information amount of the data, which causes degradation of the quality of recording/printout.

SUMMARY OF THE INVENTION

It is an object of the present invention to provide a data receiving system, a data output method therefor, and a data receiving apparatus, which enable, even when the location of a recipient is changed, a sender to always send data to the same transmission destination, and the recipient to obtain received data from a nearest output terminal apparatus, and a control program for implementing the data output method.

To attain the above object, in a first aspect of the present invention, there is provided a data receiving system comprising a data receiving apparatus that receives data addressed to one of at least one predetermined address, as received data through a communication network, and at least one output terminal apparatus that receives the received data from the data receiving apparatus and outputs the received data, wherein the data receiving apparatus comprises a relationship information-registering device that registers relationship information associating the at least one predetermined address with corresponding at least one piece of identification information on the at least one output terminal apparatus, and a received data transfer device that selects at least one predetermined output terminal apparatus from the at least one output terminal apparatus based on the one of the at least one predetermined address to which the received data is addressed, and the relationship information, and then transfers the received data to the predetermined output terminal apparatus.

Preferably, the data receiving system comprises at least one information processing terminal apparatus connected to the relationship information-registering device, and the relationship information can be updated by the information processing terminal apparatus.

Also preferably, the relationship information associates corresponding ones of the predetermined address, the at least one piece of the identification information on the output terminal apparatus, and at least one condition for output of received data with one another.

Also preferably, the data receiving system comprises a monitoring device that monitors an operating status of the output terminal apparatus, and the received data transfer device selects the predetermined output terminal apparatus based on the relationship information and the operating status of the output terminal apparatus monitored by the monitoring device.

Preferably, the data receiving system comprises an information processing terminal apparatus associated with the predetermined address, the information processing terminal apparatus being connected to the predetermined output terminal apparatus, and when the predetermined output terminal apparatus receives the received data from the received data transfer device and outputs the received data, the predetermined output terminal apparatus notifies the information processing terminal apparatus of identification information on the predetermined output terminal apparatus itself and information indicating that the received data has been output.

Preferably, when the predetermined output terminal apparatus receives the received data from the received data transfer device and outputs the received data, the predetermined output terminal apparatus visibly displays or audibly outputs information indicating that the received data has been output.

Also preferably, each of the at least one predetermined address is a host address generated based on an IP address automatic generation protocol and unique to each of at least one of the at least one output terminal apparatus, the at least one of the at least one output terminal apparatus being associated with the predetermined address, and the each of the at least one predetermined address being assigned to an output terminal apparatus user or an output terminal apparatus user group.

Preferably, the data receiving system comprises a plurality of the output terminal apparatuses sharable by a plurality of output terminal apparatus users or a plurality of output terminal apparatus user groups, and the relationship information associates a plurality of the predetermined addresses assigned to the respective output terminal apparatus users or the respective output terminal apparatus user groups, with pieces of the identification information on the output terminal apparatuses.

More preferably, each of the output terminal apparatus users or the output terminal apparatus user groups can use at least two of the output terminal apparatuses, and the relationship information associates the predetermined addresses, pieces of the identification information on the output terminal apparatuses, and priorities in use assigned to the at least two of the output terminal apparatuses useable by each of the output terminal apparatus users or the output terminal apparatus user groups, with one another.

To attain the above object, in a second aspect of the present invention, there is provided a data receiving apparatus that receives data addressed to one of at least one predetermined address, as received data through a communication network, comprising a relationship information-registering device that registers relationship information associating the at least one predetermined address with corresponding at least one piece of identification information on the at least one output terminal apparatus that receives the received data from the data receiving apparatus and outputs the received data, and a received data transfer device that selects at least one predetermined output terminal apparatus from the at least one output terminal apparatus based on the one of the at least one predetermined address to which the received data is addressed, and the relationship information, and then transfers the received data to the predetermined output terminal apparatus.

To attain the above object, in a third aspect of the present invention, there is provided a data output method for a data receiving system comprising a data receiving apparatus that receives data addressed to one of at least one predetermined address, as received data through a communication network, and at least one output terminal apparatus that receives the received data from the data receiving apparatus and outputs the received data, comprising a relationship information registering step of registering relationship information associating the at least one predetermined address with corresponding at least one piece of identification information on the at least one output terminal apparatus, and a received data transfer step of selecting at least one predetermined output terminal apparatus from the at least one output terminal apparatus based on the one of the at least one predetermined address to which the received data is addressed, and the relationship information, and then transferring the received data to the predetermined output terminal apparatus.

To attain the above object, in a fourth aspect of the present invention, there is provided a computer-readable control program for implementing a data output method for a data receiving system comprising a data receiving apparatus that receives data addressed to one of at least one predetermined address, as received data through a communication network, and at least one output terminal apparatus that receives the received data from the data receiving apparatus and output the same, comprising a relationship information registering module for registering relationship information associating the at least one predetermined address with corresponding at least one piece of identification information on the at least one output terminal apparatus, and a received data transfer module for selecting at least one predetermined output terminal apparatus from the at least one output terminal apparatus based on the one of the at least one predetermined address to which the received data is addressed, and the relationship information, and then transferring the received data to the predetermined output terminal apparatus.

According to the present invention, even if the location of a recipient is shifted anywhere, a sender can always send data to the same transmission destination, and the recipient can favorably obtain received data from a nearest output terminal apparatus.

Further, irrespective of the type and size of data transmitted from a transmission source, it is possible to output the data at a receiving end while maintaining quality of the data at its best.

The above and other objects, features, and advantages of the invention will become more apparent from the following detailed description taken in conjunction with the accompanying drawings.

BRIEF DESCRIPTION OF THE DRAWINGS

FIG. 7 is a view showing an example of a registration screen displayed on the personal computer terminal during the relationship map information registering/updating process shown in FIG. 6;

FIG. 8 is a diagram showing an example of the relationship map information stored in a hard disk of the server;

FIG. 11 is a diagram showing an example of relationship map information stored in a hard disk of the server of the data receiving system according to the second embodiment, with a multi-function peripheral operating status added to the information;

FIG. 13B is the remaining part of the flowchart of FIG. 13A.

DETAILED DESCRIPTION OF THE PREFERRED EMBODIMENTS

The present invention will now be described in detail below with reference to the drawings showing preferred embodiments thereof.

First, a communication system including a data receiving system according to a first embodiment of the present invention will be described with reference to FIG. 1.

Figure 1:
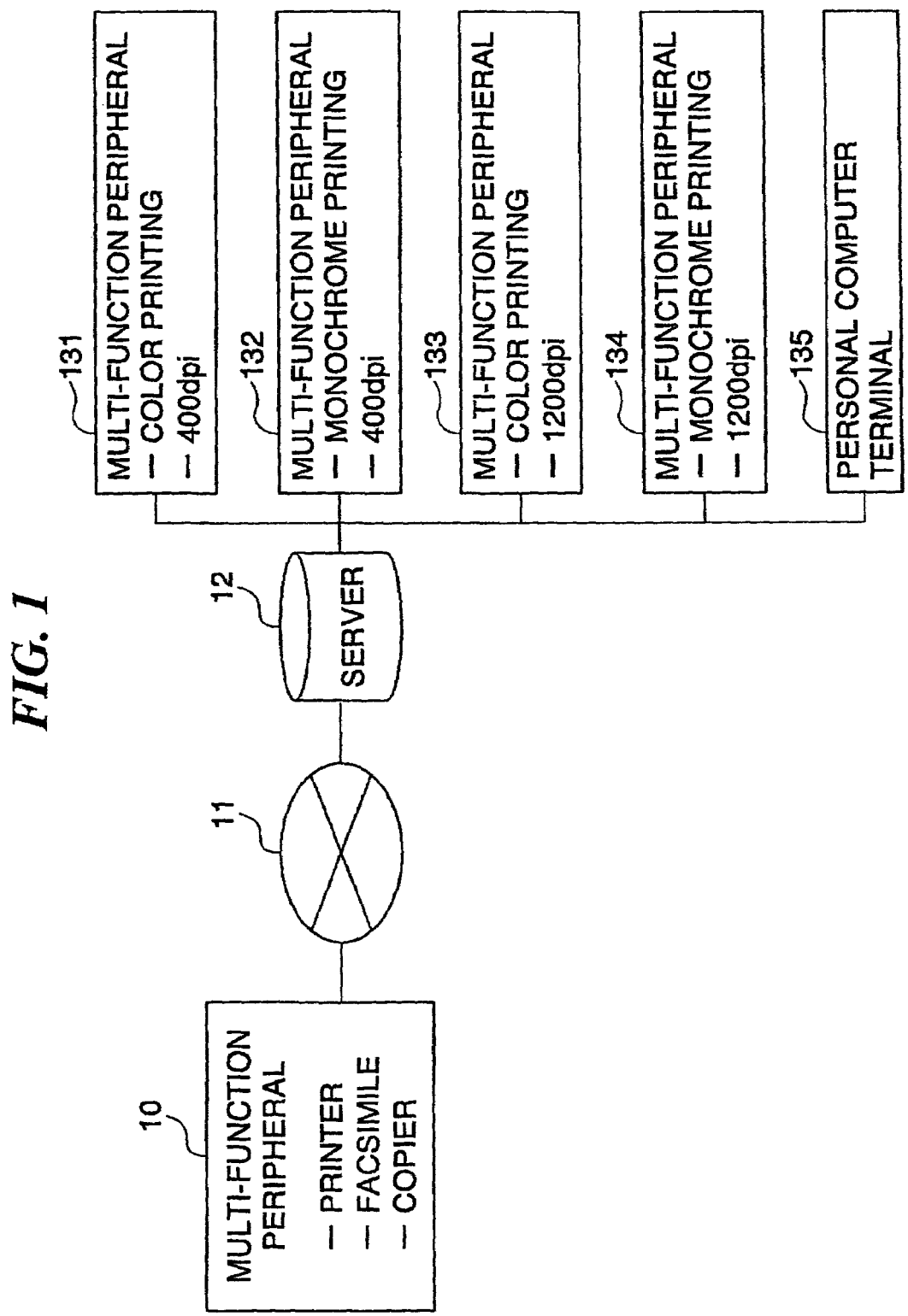
FIG. 1 is a schematic diagram of a communication system including a data receiving system according to a first embodiment of the present invention.

FIG. 1 is a schematic diagram showing the configuration of the communication system including the data receiving system according to the first embodiment.

The communication system is comprised of a data receiving system, and a multi-function peripheral 10 connected to a server 12 of the data receiving system via the Internet 11. The server 12 is connected to a plurality of multi-function peripherals, such as first to fourth multi-function peripherals 131, 132, 133 and 134, and a personal computer terminal 135 e.g. via, a LAN installed in an office. In short, the data receiving system according to the present embodiment is comprised of the server 12 (data receiving apparatus), the multi-function peripherals 131, 132, 133 and 134 (output terminal apparatuses), and the personal computer terminal 135 (information processing terminal apparatus).

According to the present embodiment, it is assumed that a plurality of individual multi-function peripheral users or a plurality of multi-function peripheral user groups (hereinafter generically referred to as "multi-function peripheral users") share the multi-function peripherals 131 to 134. It should be noted that although the multi-function peripheral 10 is hereinafter referred to as the transmitting-end multi-function peripheral 10 for convenience of description, it is to be understood that the multi-function peripheral 10 is capable of not only data transmission but also data reception. Similarly, the server 12 and the multi-function peripherals 131 to 134 are each provided with a function of transmitting data as well as a function of receiving data.

The first and second multi-function peripherals 131 and 132 are capable of performing printing at a resolution of 400 dpi. The first multi-function peripheral 131 is a color multi-function peripheral capable of color printing, and the second multi-function peripheral 132 is a monochrome multi-function peripheral for use in monochrome printing. The third and fourth multi-function peripherals 133 and 134 are capable of performing printing at a resolution of 1200 dpi. The third multi-function peripheral 133 is a color multi-function peripheral, and the fourth multi-function peripheral 134 is a monochrome multi-function peripheral.

In the present embodiment, a multi-function peripheral may be any one of a printer, a facsimile terminal, and a copying machine insofar as the multi-function peripheral is capable of performing communication via a network using the Internet protocol version 6 (IPv6) as a network layer protocol.

More specifically, in the present embodiment, each of the transmitting-end multi-function peripheral 10, the first to fourth multi-function peripherals 131 to 134, the personal computer terminal 135, and the server 12 has a global unique IP address (i.e. an IPv6 address). The Internet 11 is an IPv6 network.

Figure 2:
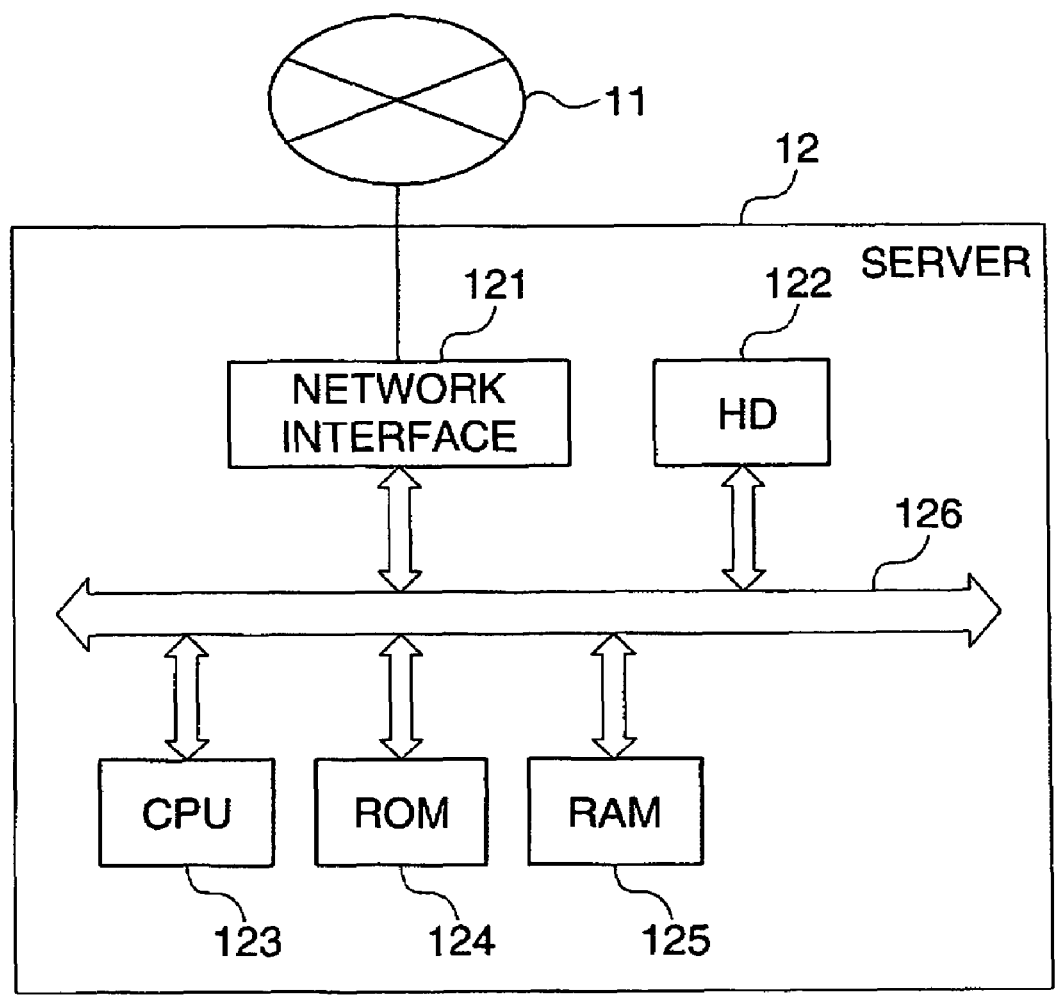
FIG. 2 is a block diagram of a server appearing in FIG. 1.

FIG. 2 is a block diagram of the server 12 appearing in FIG. 1.

As shown in FIG. 2, the server 12 is comprised of a CPU 123, a ROM 124, and a RAM 125, as well as a network interface 121 connected to the Internet 11 and a hard disk (HD) 122 as an external storage device. These component elements 121 to 125 are interconnected via a bus 126.

The CPU 123 controls the overall operation of the server 12. The RAM 125 is a temporary storage device, and the ROM 124 is a read-only memory storing data, such as programs (including a control program associated with processing executed in steps S52 to S57 in FIGS. 9A and 9B, described hereinafter), in an unerasable manner.

The network interface 121 is used for data transmission/reception between the server 12 and an external apparatus. The server 12 is connected to the Internet 11 via the network interface 121 to perform IPv6 communication. The hard disk (HD) 122 stores data addressed to predetermined addresses and received via the Internet 11 (reception and storage of the data by the HD 122 is hereinafter referred to as "primary reception"). Further, the HD 122 stores relationship map information, described in detail hereinafter, as a map of the relationships between identification code information of the multi-function peripherals 131 to 134 managed by the server 12 and the IPv6 addresses of the recipients (i.e. predetermined addresses assigned to the respective multi-function peripheral users).

Figure 3:
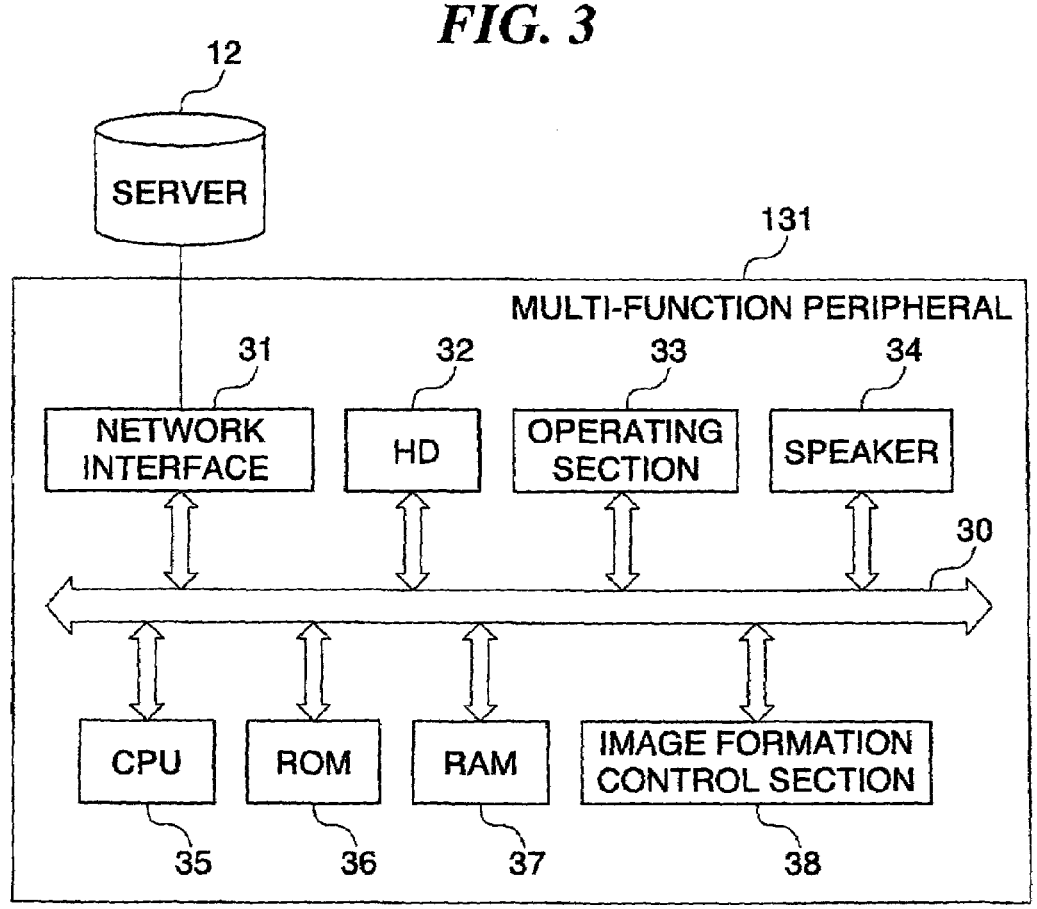
FIG. 3 is a block diagram of a multi-function peripheral appearing in FIG. 1.

FIG. 3 is a block diagram of the multi-function peripheral 131 appearing in FIG. 1. In the present embodiment, the second to fourth multi-function peripherals 132 to 134 are identical in configuration to the first multi-function peripheral 131, but this is not limitative, but they may be slightly different in configuration from the first multi-function peripheral 131.

The first multi-function peripheral 131 includes a CPU 35, a ROM 36, a RAM 37, and a hard disk (HD) 32. The CPU 35 controls the overall operation of the first multi-function peripheral 131. The RAM 37 is a temporary storage device, and the ROM 36 stores data, such as programs (including a control program associated with processing executed in a step S58 in FIG. 9B, described hereinafter), in an unerasable manner. The hard disk (HD) 32 as an external storage device stores not only information indicative of the identification code of the first multi-function peripheral 131 itself, but also destination address information and facsimile numbers to be used in transmission operations of the first multi-function peripheral 131, and image data stored by the user.

Further, the multi-function peripheral 131 is provided with a network interface 31, an image formation control section 38, an operating section 33, and a speaker 34. The network interface 31 is used for data transmission/reception between the multi-function peripheral 131 and the server 12, and the image formation control section 38 is a control section that prints data received via the network interface 31. The printing capabilities (resolution and color printing or monochrome printing) of each of the multi-function peripherals 131 to 134 in the present embodiment are realized by configuring the image formation control section 38 of the multi-function peripheral to fit desired printing capabilities. The operating section 33 provides man-machine interface with the multi-function peripheral, for enabling instruction of control commands to the multi-function peripheral and acquisition of information, and the speaker 34 sends information to the user by voice.

The above-mentioned component elements forming the multi-function peripheral 131 are interconnected via a bus 30 as shown in FIG. 3. The multi-function peripherals 132 to 134 are similar in configuration to the multi-function peripheral 131, and therefore description of the configurations thereof is omitted.

Figure 4:
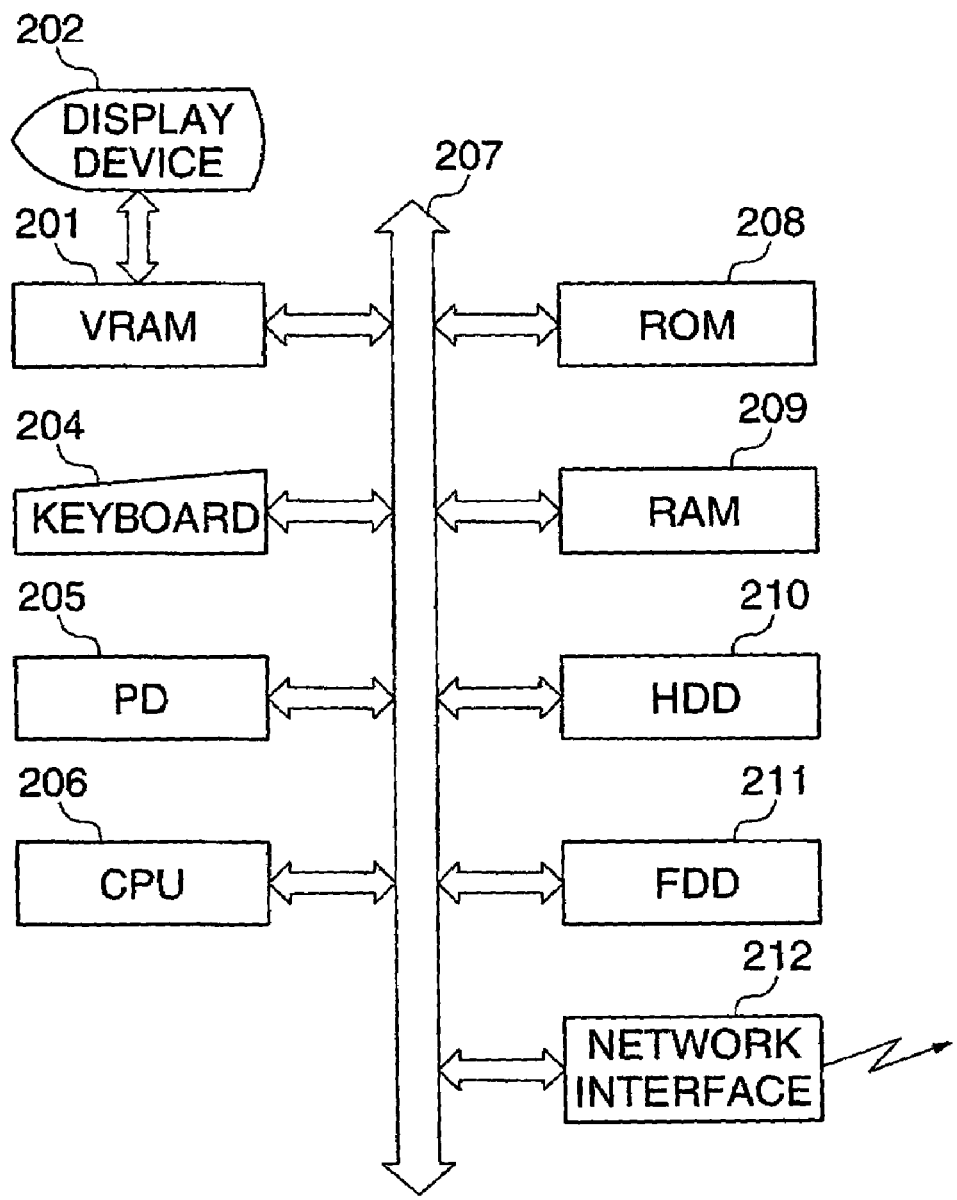
FIG. 4 is a block diagram of a personal computer terminal appearing in FIG. 1.

FIG. 4 is a block diagram showing the configuration of the personal computer terminal 135 appearing in FIG. 1.

The personal computer terminal 135 is comprised of a video RAM (VRAM) 201, a keyboard 204, a pointing device (PD) 205, a CPU 206, a ROM 208, a RAM 209, a hard disk (HDD) 210, a floppy (registered trademark) disk (FDD) 211, and a network interface 212. These devices are interconnected via a bus 207.

The CPU 206 controls the above-mentioned devices of the personal computer terminal 135 based on programs (including an application program associated with a map information registration process, described hereinafter with reference to FIG. 6) stored in the ROM 208 or the hard disk 210. The RAM 209 is used as a work area for arithmetic operations and the like executed by the CPU 206 and a temporary save area for carrying out error processing. The hard disk 210 and the floppy (registered trademark) disk 211 are used for storing various databases and application programs.

The video RAM 201 is a memory for loading and storing characters and images to be displayed on the screen of a display device 202. The keyboard 204 is provided with various kinds of entry keys. The pointing device 205 is implemented e.g. by a mouse for pointing to an icon and the like on the screen.

Next, a description will be given of the configuration of an IP address on the IPv6 network (hereinafter referred to as "the IPv6 address").

Figure 5A:
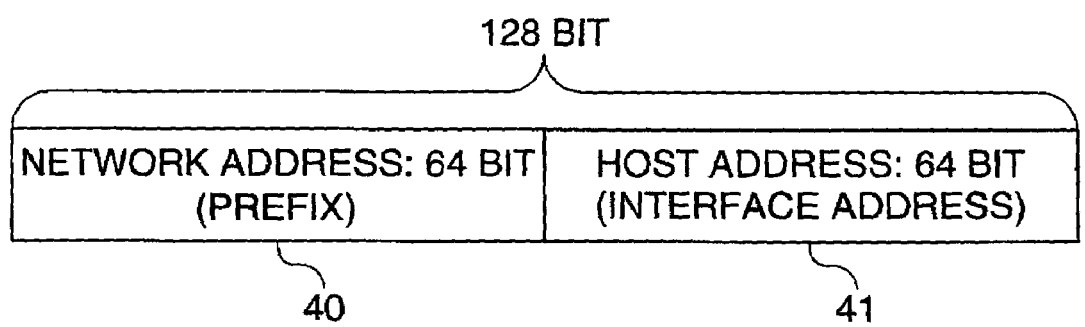
FIG. 5A is a diagram showing the format of an IPv6 address, employed in the first embodiment.
Figure 5B:
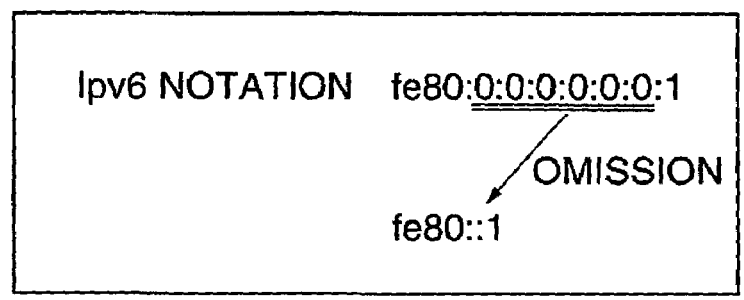
FIG. 5B is a diagram useful in explaining a notation of the IPv6 address.

FIG. 5A is a diagram showing the format of an IPv6 address used in the present embodiment, and FIG. 5B is a diagram useful in explaining the notation of the IPv6 address.

The IPv6 address has a 128-bit binary identification ID with the first 64 bits thereof as a network address section 40 (or "prefix") and the second 64 bits thereof as a host address section 41 (or "interface ID").

The network address section 40 is an address for identifying a network to which the IPv6-compatible terminal apparatus is connected, and is notified by a router within a network link (i.e. within an area where the data link layer communication is possible). The host address section 41 is automatically generated by the IPv6-compatible terminal apparatus itself, based on an apparatus address (MAC address) assigned to a network interface processing device provided in the IPv6-compatible terminal apparatus.

A MAC address is an identification ID assigned to each network interface processing device and managed as a global unique identification ID by a vendor who provides network interface processing devices, for data link layer communication. Therefore, the host address section 41 generated from the MAC address is a global unique address. It should be noted that the host address section 41 is not necessarily generated based on the MAC address insofar as the host address section 41 is unique within the link to which the terminal apparatus is connected. More specifically, since the network addresses of respective links are different each other, if host addresses within the same link means are different from each other, or unique, it means that each of the address is a unique address in the Internet formed by interconnecting the links, so that the uniqueness of the associated IPv6 address is ensured.

FIG. 5B shows an example of the notation of an IPv6 address, in which 128 bits are divided into eight 16-bit sections separated by ":" (colon), and each of the 16-bit sections is represented by a hexadecimal digit [0 to ffff]. In short, an IPv6 address is represented by eight hexadecimal digits [0 to ffff] separated by ":". In the IPv6 address notation rule, only a series of "0" bits can be omitted. If 16 bits in a section separated by a colon are all equal to 0, "0000" can be represented as "0". Then, if a plurality of "0" sections arranged in series in a manner separated by colons, respectively, are obtained, the sections can be represented by two consecutive colons. For example, if "fe80:0:0:0:0:0:0:1" is obtained as shown in FIG. 5B, it can be represented as "fe80::1". It should be noted that the use of this notation using "::" is allowed in only one part of an IPv6 address.

Each IPv6 address is a unique global address in the Internet formed by interconnecting a plurality of links, as described above, and in the present embodiment, it is assumed that IPv6 addresses are assigned to respective individual recipients (multi-function peripheral users) or recipient groups.

A process for registering/updating in the server 12, the relationship map information as a map of the relationship between the IPv6 addresses assigned to the respective individual recipients or recipient groups and the identification code information of the multi-function peripherals 131 to 134 will be described with reference to FIGS. 6 and 7.

Figure 6:
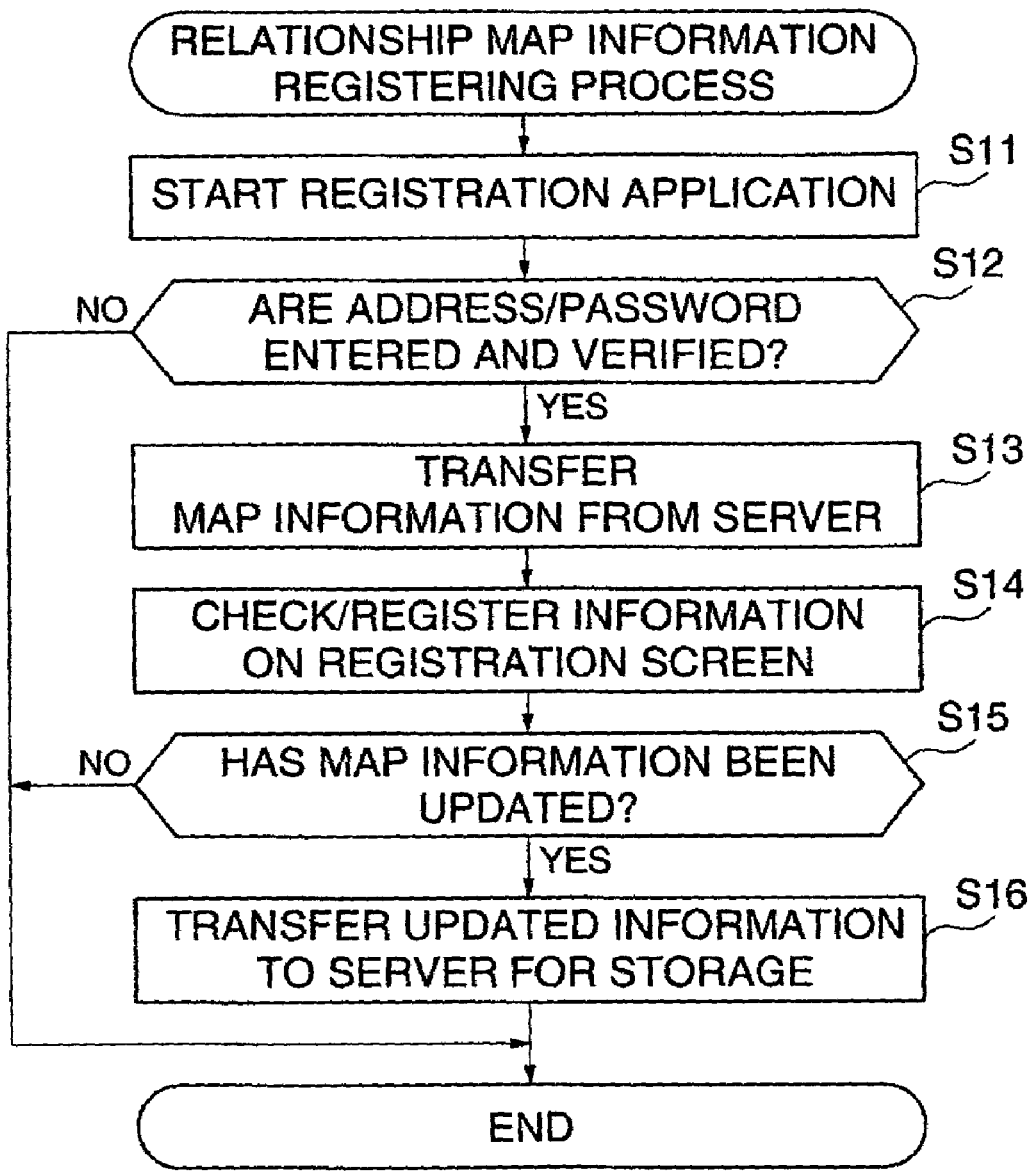
FIG. 6 is a flowchart showing a relationship map information registering/updating process according to the first embodiment.

FIG. 6 is a flowchart showing the relationship map information registering/updating process according to the present embodiment. FIG. 7 is a view showing a registration screen displayed on the personal computer terminal 135 for execution of the relationship map information registering/updating process shown in FIG. 6.

The relationship map information registering/updating process is a registration process executed by a recipient assigned e.g. "fe08::1" as a recipient's IP address (IPv6 address) so as to register in the server 12 a nearest recording/printout terminal (multi-function peripheral) closest to the recipient. This process is carried out using the personal computer terminal 135 connected to the server 12.

First, an application program stored in the server 12, for registering/changing the relationship map information, is started via the personal computer terminal 135 (step S11). Next, the user's IPv6 address and password information are entered and verified against an IPv6 address and password information previously stored, so as to cause the server 12 to transfer the relationship map information for reference (step S12). If the entered IPv6 address and password information do not match the stored IPv6 address and password information, the present relationship map information registering/updating process is immediately terminated.

If the user is authenticated through the verification, the relationship map information is transferred from the server 12 to the personal computer terminal 135 (step S13), and the registration screen illustrated in FIG. 7 by way of example is displayed on the display device 202 of the personal computer terminal 135. In the example of the registration screen in FIG. 7, four recording/printout terminals (first to fourth multiple-function apparatuses 131 to 134) can be registered as output terminals for printing, and priorities in use are assigned to the respective output terminals. On the registration screen, the user simply confirms settings of condition filters (printing color filters and resolution filters) and the identification codes of the output terminals, or changes the settings for registration (step S14).

Then, the immediately previous registration information and the current registration information are compared to thereby determine whether or not the relationship map information has been updated (step S15). If it is determined that the relationship map information has been updated, the updated relationship map information is transferred to the server 12 and is stored in the hard disk 122 (step S16). If the relationship map information has not been updated, the present process is immediately terminated.

FIG. 8 is a diagram showing an example of the relationship map information registered and stored in the hard disk 122 of the server 12 through the relationship map information registering/updating process in FIG. 6.

According to the illustrated example, the terminals registered as the nearest recording/printout terminals in the registration screen in FIG. 7 by the recipient assigned the recipient's IP address (IPv6 address) "fe08::1" correspond to the four multi-function peripherals 131 to 134, respectively, and priorities, image format conditions (printing colors and resolutions), and identification codes associated with the respective multi-function peripherals are set in the relationship map information. Identification codes are for identifying respective multi-function peripherals within an office, and hence each identification code is required to be unique e.g. under the management of the server 12.

As shown in FIG. 8, the settings of the multi-function peripheral 131 are configured such that the printing color is "color", the resolution "not higher than 400 dpi", and the identification code "mfp131:cl:400". Further, the multi-function peripheral 131 is assigned a second priority for use. More specifically, as shown in FIG. 8, the image format condition associated with the multi-function peripheral 131 is recorded in a second one from top of four entry rows concerning the image format conditions. The settings of the multi-function peripheral 132 are configured such that the printing color is "monochrome", the resolution "not higher than 400 dpi", and the identification code "mfp132:Bk:400", and the multi-function peripheral 132 is assigned a first priority for use. The settings of the multi-function peripheral 133 are configured such that the printing color is "color", the resolution "not lower than 400 dpi", and the identification code "mfp133:cl:1200", and the multi-function peripheral 133 is assigned a fourth priority for use. The settings of the multi-function peripheral 134 are configured such that the printing color is "monochrome", the resolution "not lower than 400 dpi", and the identification code "mfp134:Bk:1200", and the multi-function peripheral 134 is assigned a third priority for use.

Figure 9A:
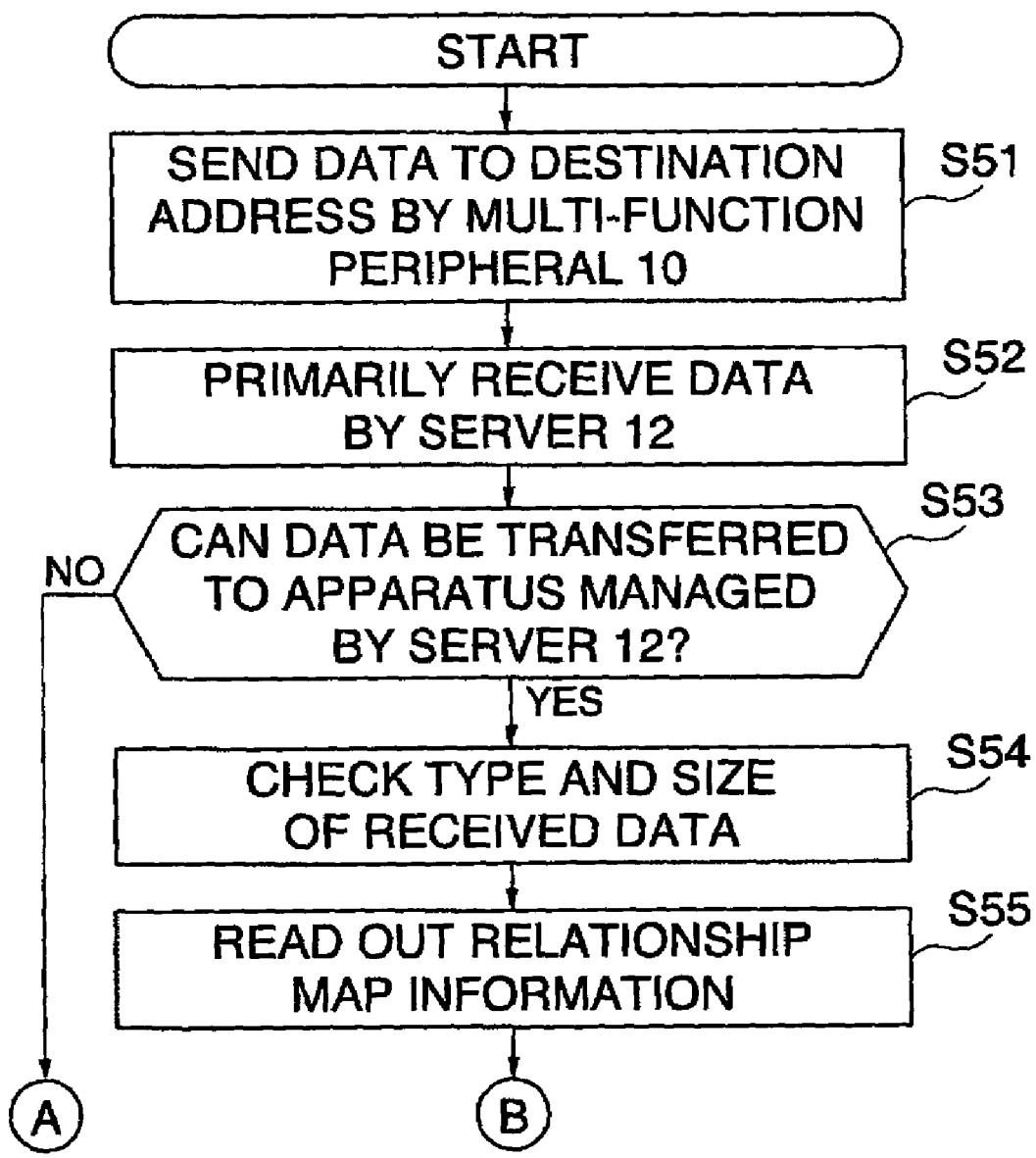
FIG. 9A is part of a flowchart showing the operation of the data receiving system according to the first embodiment.
Figure 9B:
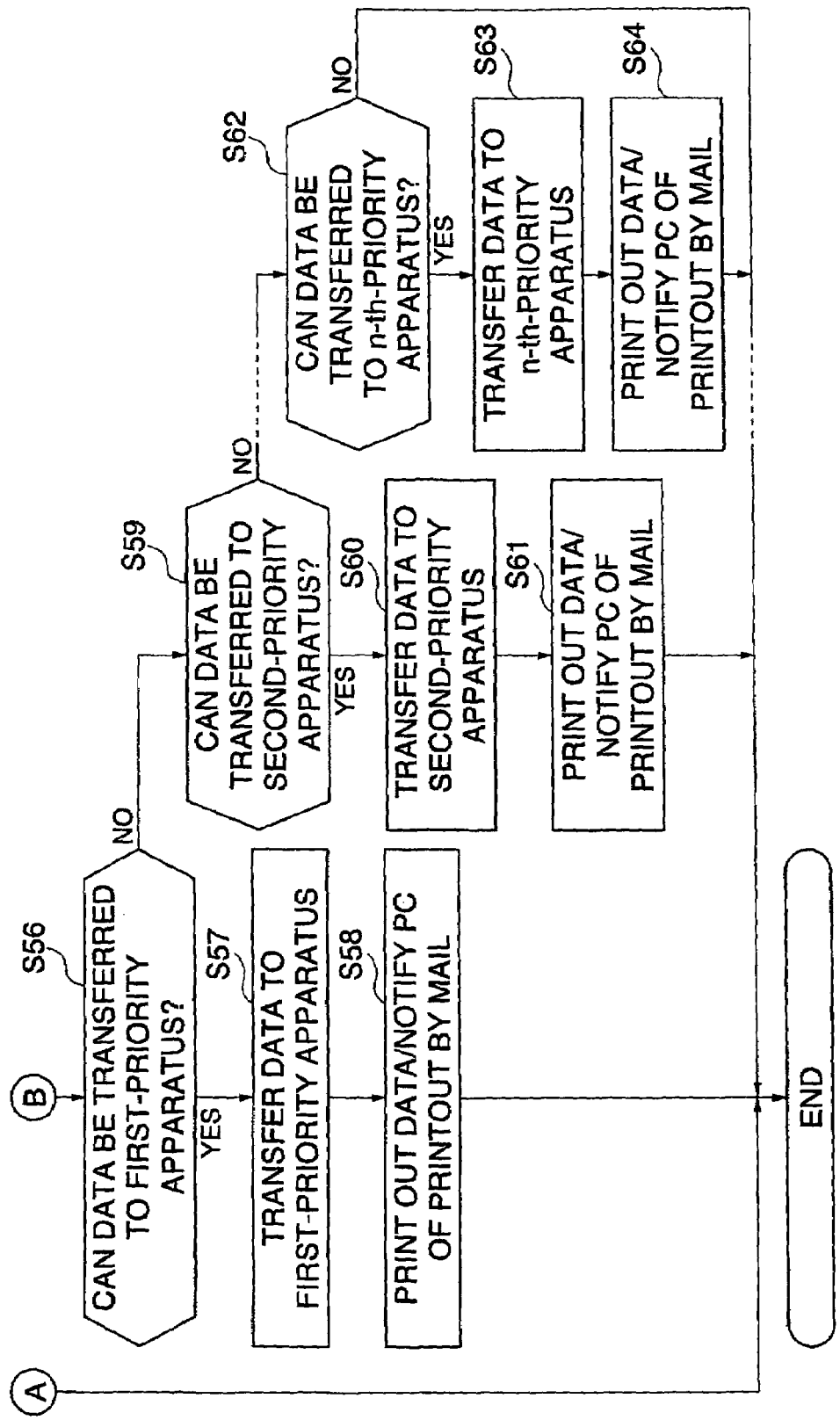
FIG. 9B is the remaining part of the flowchart of FIG. 9A.

Next, a sequence of operations according to the present embodiment will be described with reference to FIGS. 9A and 9B. FIG. 9A is part of a flowchart showing the operation of the data receiving system according to the first embodiment, and FIG. 9B is the remaining part thereof.

First, a sender sets the IPv6 address of a transmission destination from the multi-function peripheral 10, causes an image reading section of the multi-function peripheral 10 to read in an original for transmission, then sends the data (step S51). The transmitted data is primarily received by the hard disk (HD) 122 of the server 12 via the Internet (step S52).

Next, the CPU 123 of the server 12 determines, based on the IPv6 address of the transmission source, whether or not the received data can be transferred to the multi-function peripherals 131 to 134 (step S53). This process is executed to realize a filtering function of rejecting data received from specific senders or receiving only data received from specific senders. Therefore, a recipient can gain access to the server 12 from the personal computer terminal 135 to set a desired filtering function in advance.

If the transmission source address associated with the received data is an address from which data transmission is not permitted, the process is terminated without transferring the received data to any of the multi-function peripherals 131 to 134. If the transmission source address is an address from which data transmission is permitted, the server 12 checks conditions for the output of the received data, or more specifically, the type and size (e.g. printing color and resolution) of the received data (step S54), and then accesses the hard disk 122 via the bus 126 to read out the previously registered relationship map information (see FIG. 8) (step S55).

Then, the server 12 compares the contents (i.e. a printing color and a resolution as image format conditions in FIG. 8) of the fetched relationship map information with the type and data size (printing color and resolution in this case) of the received data, and determined whether or not the received data can be output to the multiple-function apparatus 132 assigned the first priority by the recipient (step S56). For example, if the received data is monochrome data with a resolution of 400 dpi, since the received data matches the image format conditions of the multi-function peripheral 132 registered in advance in the relationship map information as the first-priority multi-function peripheral, the received data is transferred from the server 12 to the multi-function peripheral 132 (step S57).

The multi-function peripheral 132 receives and prints out the received data, and then carries out processing for the recipient by sending a notification that the received data has been printed out, together with its own identification code, e.g. by e-mail to the personal computer terminal 135 in use by the recipient (step S58), followed by termination the present procedure of operations of the data receiving system.

On the other hand, if the received data does not match the image format conditions associated with the first-priority multi-function peripheral 132 registered in the relationship map information, the output of the received data to the first-priority multi-function peripheral 132 is not permitted in the step S56, and the operation proceeds to a step S59, wherein it is determined whether or not the received data can be output to the second-priority multi-function peripheral 131. If it is determined in the step that the received data can be output to the multi-function peripheral 131, the same processing as executed in the steps S57 and S58 is carried out in steps S60 and S61.

As described above, when the type and size of received data matches the relationship map information, the received data is transferred to a multi-function peripheral assigned a higher priority, whereas when the type and size of the received data do not match the relationship map information, it is determined whether or not the received data can be output to a multi-function peripheral assigned a next higher priority (step S62), and if it is possible to output the data, transfer of the received data to the multi-function peripheral is allowed (step S63). Then, the received data is printed out, and a notification of completion of the printout of the received data is output (step S64). This processing is sequentially carried out, if necessary, until the processing is performed on a multi-function peripheral assigned a lowest (n) priority (n=4 in the present embodiment).

For example, if received data is color data having a resolution of 1200 dpi, it is transferred to the fourth-priority multi-function peripheral 133 (capable of printing color data at the resolution of 1200 dpi) registered in the relationship map information (steps S62 and S63). Then, the multi-function peripheral 133 prints out the received data, and sends a notification that the received data has been printed out, together with its own identification code, to the personal computer terminal 135 in use by the recipient (step S64).

The data receiving system according to the first embodiment provides the following advantageous effects:

(1) Global IPv6 addresses are assigned in advance to respective individual users or user groups of recording/printout terminals so as to perform data transmission/reception, so that even if the location of a recipient is shifted anywhere in an office, a sender can always send data to the same transmission destination. Further, since the recipients' addresses and information identifying each of the recording/printout terminals are managed by the server 12, in particular, such that the correspondence between the recipients' addresses and the recording/printout terminals is constantly maintained in a proper state, a recipient can cause a nearest recording/printout terminal to favorably output data received from a sender.

More specifically, in data transmission/reception performed between the server 12 and the multi-function peripheral 10 connected to each other via the Internet communication network, data is sent to a designated recipient's address, and the data sent to the recipient's address is primarily received by the server 12. Recipients are assigned different IPv6 addresses, as respective recipient's addresses. The server 12 holds the relationship information map as a map of the relationship between the recipients' addresses and the identification codes of recording/printout terminals (the multi-function peripherals 131 to 134 in the present embodiment), and when the location of a multi-function peripheral user (recipient) has been changed e.g. due to a reallocation of personnel within an office, the user can carry out the relationship map information registering/updating process in FIG. 6 on the personal computer terminal 135 to update the relationship map information such that the identification code of each of one or more recording/printout terminals closest to a new location of the recipient can be associated with the recipients' addresses.

Thus, a sender always has only to send data to a designated recipient's address, and a recipient can always output data sent to the recipient's address, using a nearest recording/printout terminal. Therefore, even if a reallocation of personnel or the like takes place within an office, a recipient can use a nearest recording/printout terminal for data output, which eliminates the necessity for notifying all senders including business partners of a facsimile number associated with a nearest multi-function peripheral whenever the recipient is shifted to a new location.

(2) Irrespective of the type and data size of data sent from a sender, a recipient can optimally record and output the data. More specifically, the server 12 manages the recipients' addresses and information (including information on the type and size of data) indicative of the recording/printout capabilities of the respective recording/printout terminals, based on the relationship map information shown in FIG. 8, and checks/determines, based on information of received data, how requirements, including a data size, are set for recording/outputting the received data. Then, the server 12 transfers the received data to a higher-priority one of the recording/printout terminals registered by the user insofar as the type and size of the received data matches the capabilities of the recording/printout terminal. Since received data is thus transferred to an appropriate recording/printout terminal, it is possible to correctly print out the data without reducing the information amount of the data.

Although in the above-described example, a plurality of users or a plurality of user groups share a plurality of multi-function peripherals, the data receiving system according to the present embodiment can be applied e.g. to the case where a single user uses a single multi-function peripheral. More specifically, if the number of installed multi-function peripherals or the number of multi-function peripheral users is supposes to be increased in the future, by constructing the above described data receiving system in advance, it is possible to improve users' convenience in the use of the multi-function peripherals in a manner coping with such a situation. Further, although in the above described embodiment, received data is output from a single multi-function peripheral selected from a plurality of multi-function peripherals, the received data can be output from a plurality of multi-function peripherals. The same applies to embodiments described below.

Next, a second embodiment of the present invention will be described with reference to FIGS. 10 to 12B.

The second embodiment is configured similarly to the first embodiment described with reference to FIGS. 1 to 8, and hence the same processing as executed in the first embodiment is performed. However, the second embodiment is distinguished from the first embodiment in that operation is carried out while taking into account the operating status of each recording/printout terminal. In the following, a detailed description will be given of the second embodiment.

Figure 10:
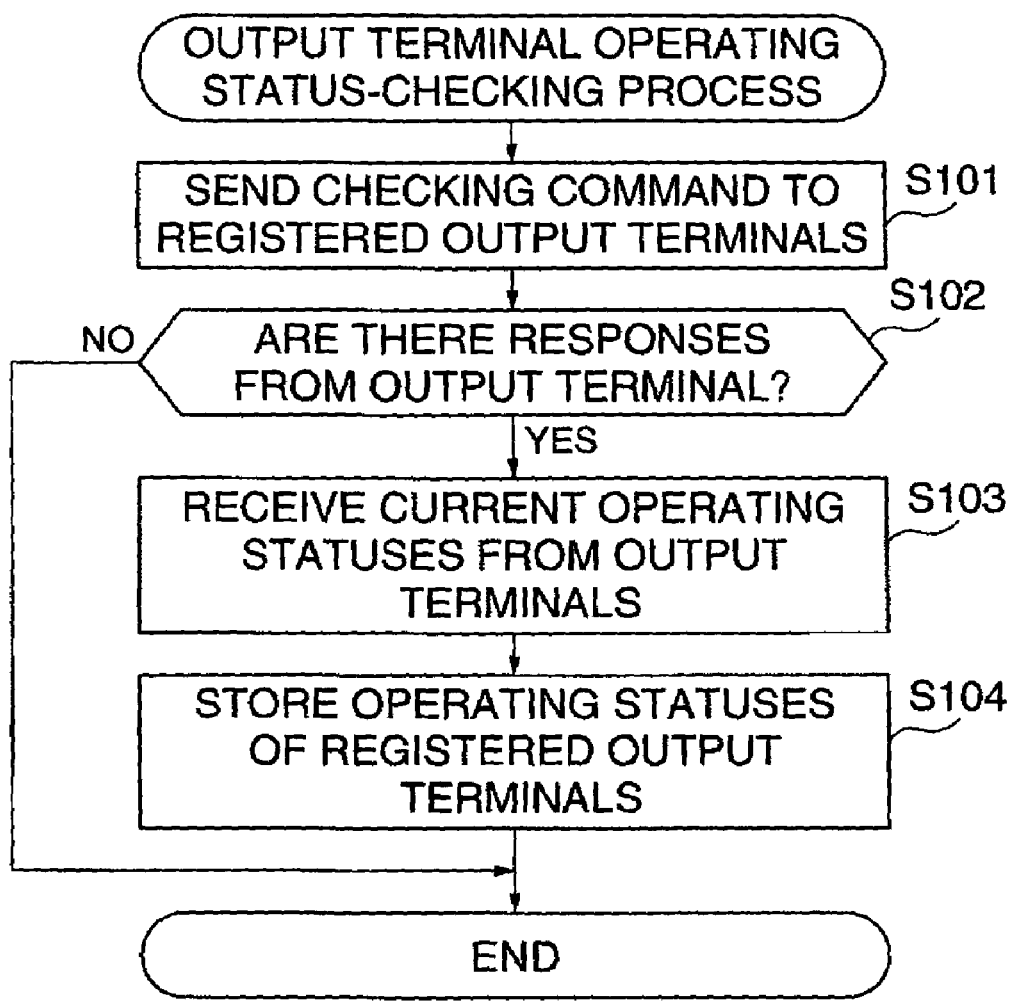
FIG. 10 is a flowchart showing an output terminal operating status-checking process which is executed by a server of a data receiving system according to a second embodiment of the present invention.

FIG. 10 is a flowchart showing an output terminal operating status-checking process which is executed by the server 12 of a data receiving system according to the second embodiment. The present process is repeatedly carried out e.g. at predetermined time intervals so as to monitor the operating statuses of the respective multi-function peripherals 131 to 134 under the control of the server 12, whereby information on the respective grasped operating statuses of the output terminals is updated as deemed appropriate.

First, the server 12 sends an operating status-checking command to each of the multi-function peripherals 131 to 134 as recording/printout terminals registered in the relationship map information described hereinabove (step S101). Next, it is checked whether or not there are responses from the multi-function peripherals 131 to 134 (step S102). If there is no response from a multi-function peripheral, it is determined that the multi-function peripheral has not power applied to it (i.e. it is in the OFF state), and the checking process for the multi-function peripheral is terminated.

Multi-function peripherals in the ON state send their response commands to the server 12, so as to notify the server 12 of their own current operating statuses in response to the checking commands from the server 12 (step S103). The server 12 checks the response commands, if any, sent from the multi-function peripherals 131 to 134. Then, the server 12 adds the operating statuses as current operating statuses to the registered relationship map information, and stores the current operating statuses in the hard disk 122 (step S104), followed by terminating the checking process.

FIG. 11 is a diagram showing an example of the relationship map information stored in the hard disk 122 of the server of the data receiving system according to the second embodiment, with the operating status of each of the multi-function peripheral contained therein. The example illustrated in FIG. 11 indicates that the first-priority multi-function peripheral 132 and the fourth-priority multi-function peripheral 133 are on standby, the second-priority multi-function peripheral 131 is executing a job, and the third-priority multi-function peripheral 134 is in the OFF state.

Figure 12A:
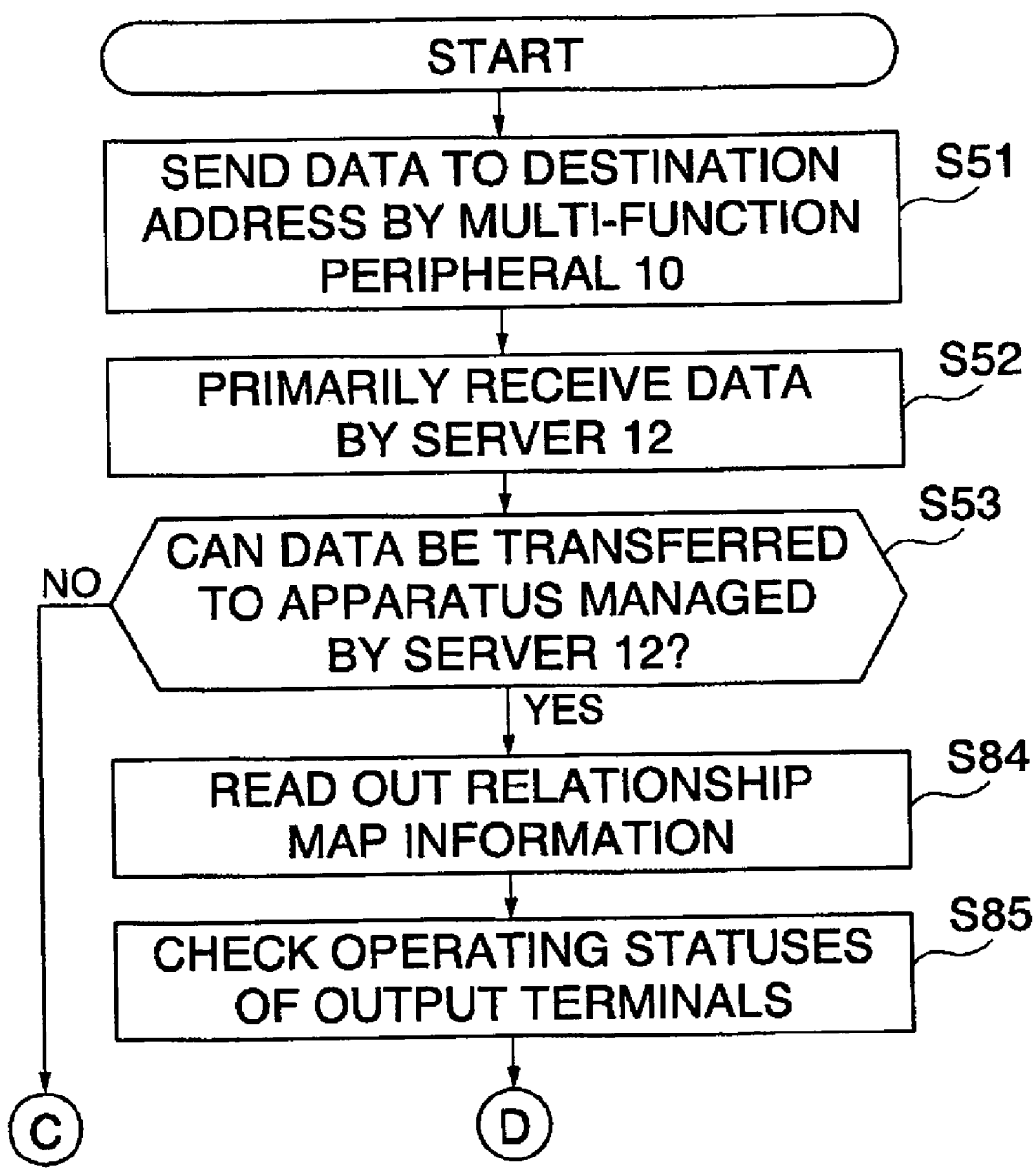
FIG. 12A is part of a flowchart showing the operation of the data receiving system according to the second embodiment.
Figure 12B:
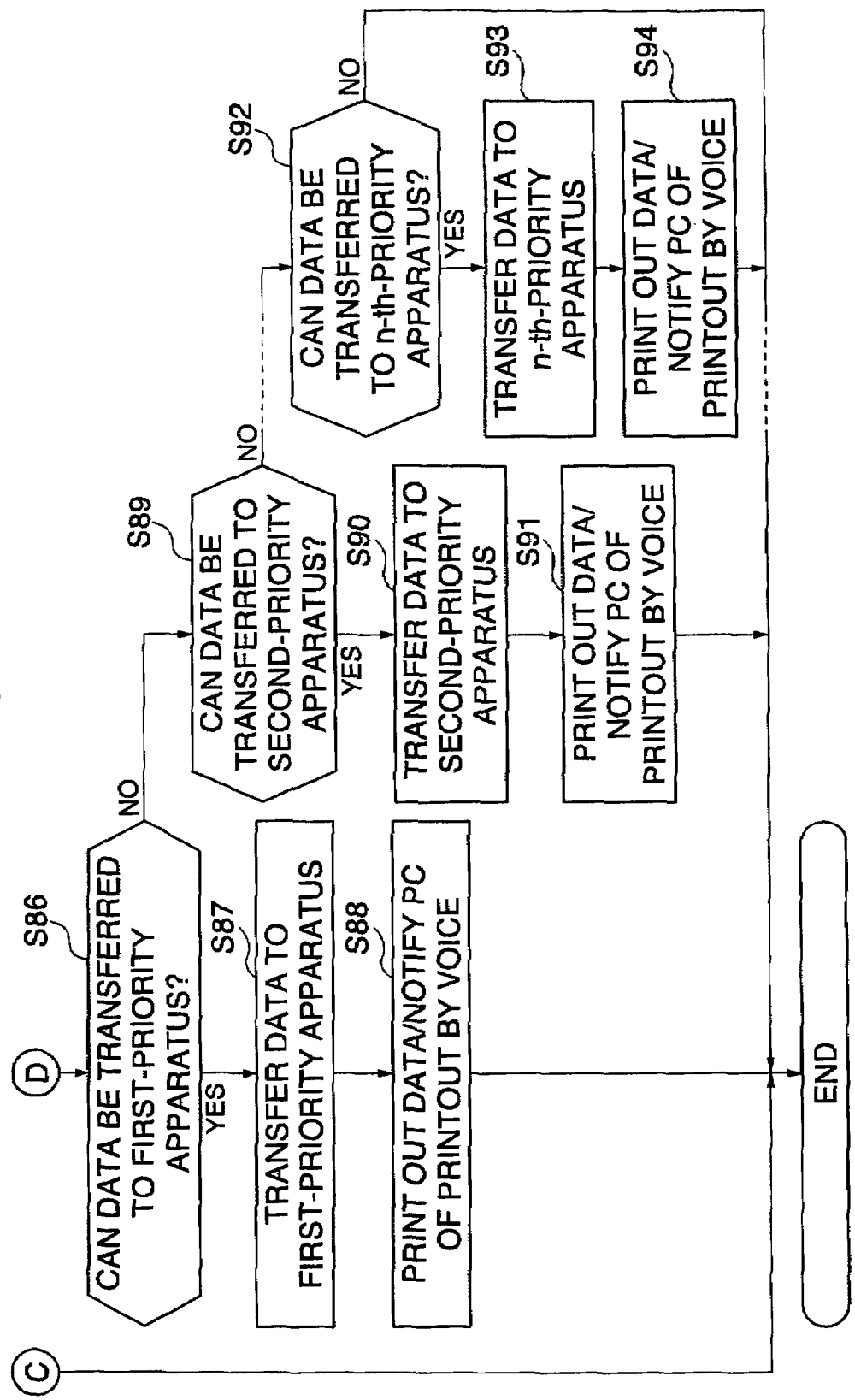
FIG. 12B is the remaining part of the flowchart of FIG. 12A.

FIG. 12A is part of a flowchart showing the operation of the data receiving system according to the second embodiment, and FIG. 12B is the remaining part thereof. Steps identical to those in FIGS. 9A and 9B are designated by identical step numbers, and description thereof is omitted.

First, in the steps S51 to S53, the same processing as described with reference to FIG. 9A is carried out. Thereafter, the server 12 reads out the relationship map information shown in FIG. 11, from the hard disk 122 (step S84). Then, the server 12 refers to the relationship map information to check the operating status of each of the multi-function peripherals 131 to 134, which was obtained and stored through the operating status-checking process shown in FIG. 10 (step S85).

Then, the server 12 determines, with reference to the checked operating status, whether or not received data can be output to the nearest multi-function peripheral 132 assigned the first priority by the recipient (step S86). In the example in FIG. 11, since the multi-function peripheral 132 on standby, the received data is immediately transferred to the multi-function peripheral 132 (step S87).

The multi-function peripheral 132 receives and prints out the received data, and then notifies the recipient by voice through the speaker 34 thereof that the received data has been printed out (step S88), followed by terminating the operation of the data receiving system.

On the other hand, if the operating status of the first-priority multi-function peripheral 132 is "during job execution" or "OFF", the output of the received data from the multi-function peripheral 132 is not permitted, and the operation proceeds to a step S89, wherein it is determined whether or not the received data can be output to the second-priority multi-function peripheral 131. If it is determined in the step S89 that the multi-function peripheral 131 on standby, which means that the received data can be output to the multi-function peripheral 131, the same processing as executed in the steps S87 and S88 is carried out in steps S90 and S91.

On the other hand, if the received data cannot be output to the multi-function peripheral 131, it is determined whether or not the received data can be output to the next-priority multi-function peripheral (step S92). If the data output is allowed, the server 12 transfers the received data to the multi-function peripheral for printout, and outputs a notification that the received data has been printed out (steps S93 and S94). This processing is sequentially carried out, if necessary, until the processing is performed on a multi-function peripheral assigned a lowest (n) priority (n=4 in the present embodiment).

As described above, the received data is transferred to a higher-priority multi-function peripheral among multi-function peripherals in the operating status permitting data output, and printed out. In other words, if a higher-priority multi-function peripheral is in an operating status, such as "during job execution", "OFF", or "apparatus downtime" for initialization, which does not permit data output, the received data is transferred to a lower-priority multi-function peripheral, and printed out.

Although in the multi-function peripheral 132, a recipient is notified by voice through the speaker 34 that the received data has been printed out, a notification "The received data has been printed out" may be displayed on the display section of the operating section 33 of the multi-function peripheral 132, instead of using the voice notification message.

The data receiving system according to the second embodiment provides the following advantageous effects:

As in the first embodiment, even if the location of a recipient is shifted anywhere in an office, a sender can always send data to the same transmission destination. Further, since recipients' addresses and information on recording/printout terminals are managed by the server 12, a recipient can cause a nearest one of the recording/printout terminals to favorably output data received from the sender. Furthermore, when the recipient's nearest recording/printout terminal is a multi-function peripheral in a status where a job is being executed by a printer or a copier, or in an apparatus downtime status, the server 12 transfers the received data to another registered multi-function peripheral in a standby status for printout. Thus, the recipient can obtain a printout of the received data irrespective of the operating status of the nearest multi-function peripheral.

Next, a third embodiment of the present invention will be described with reference to FIGS. 13A and 13B.

The present embodiment is similar to the second embodiment in that a recording/printout terminal to be used for outputting received data is selected from a plurality of recording/printout terminals, based on the operating statuses of the respective recording/printout terminals, and similar to the first embodiment described in that the type and size of received data are considered in selecting one of the terminals for data output.

Figure 13A:
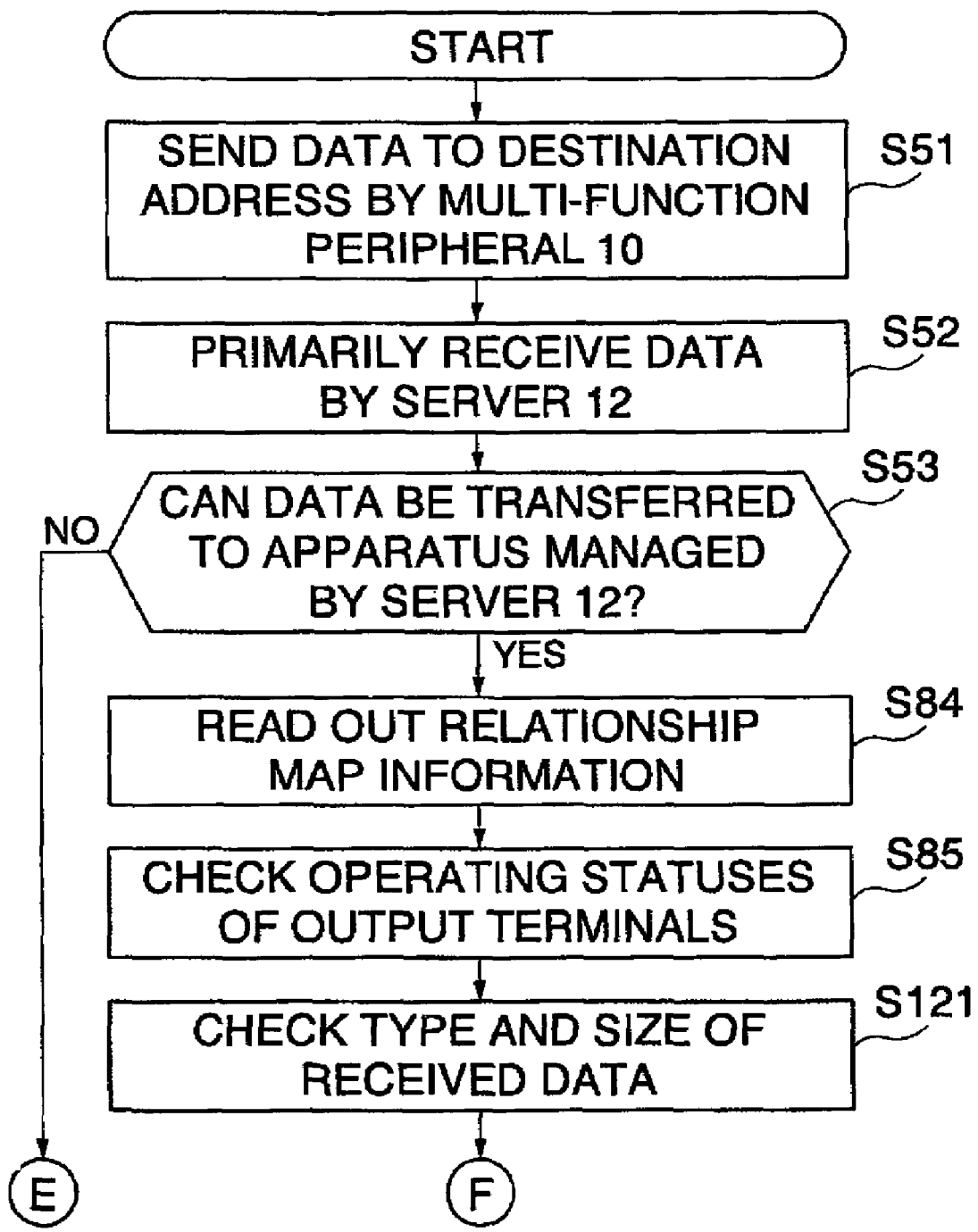
FIG. 13A is part of a flowchart showing the operation of a data receiving system according to a third embodiment of the present invention.

FIG. 13A is part of a flowchart showing the operation of a data receiving system according to the third embodiment, and FIG. 13B is the remaining part thereof. Steps identical to those in FIGS. 12A and 12B are designated by identical step numbers, and description thereof is omitted.

First, in the steps S51 to S53, S84, and S85, the same processing as described with reference to FIG. 12A is carried out. Then, the server 12 checks the type and size of the received data (step S121).

In steps S122 to S130, based on the conditions of current output terminal operating statuses obtained from the relationship map information and the type and size of the received data, and following the same method as employed in the first and the second embodiments, a multi-function peripheral is selected which is registered in the relationship map information as one matching the type and size of the received data and is assigned a highest priority among ones of the multi-function peripherals 131 to 134, which are in the operating status permitting output of received data, and then the received data is transferred to the selected multi-function peripheral and printed out.

According to the present embodiment, it is possible to provide the same advantageous effects as provided by both the first and second embodiments.

Although in the first to third embodiments, the server 12 is disposed at a location upstream of the multi-function peripherals 131 to 134 and data is primarily received by the server 12, it is possible to provide not the server 12 but one of the multi-function peripherals 131 to 134 with the function of the server 12 to thereby carry out the same operations as performed in the above described embodiments.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

This application claims the benefit of Japanese Application No. 2005-062522, filed Mar. 7, 2005, which is hereby incorporated by reference herein in its entirety.

What is claimed is:

1. A data receiving system comprising:
a data receiving apparatus that receives data addressed to one of at least one predetermined address, as received data through a communication network; and
at least one output terminal apparatus that receives the received data from said data receiving apparatus and outputs the received data,
wherein said data receiving apparatus comprises:
a relationship information-registering device that registers relationship information associating the at least one predetermined address with corresponding at least one piece of identification information on said at least one output terminal apparatus; and
a received data transfer device that selects at least a predetermined output terminal apparatus from said at least one output terminal apparatus based on the one of the at least one predetermined address to which the received data is addressed, and the relationship information, and then transfers the received data to said predetermined output terminal apparatus,
wherein the data receiving system comprises an information processing terminal apparatus associated with the predetermined address, said information processing terminal apparatus being connected to said predetermined output terminal apparatus, and
wherein when said predetermined output terminal apparatus receives the received data from said received data transfer device and outputs the received data, said predetermined output terminal apparatus notifies said information processing terminal apparatus of identification information on said predetermined output terminal apparatus itself and information indicating that the received data has been output.

2. A data receiving system as claimed in claim 1, comprising at least one information processing terminal apparatus connected to said relationship information-registering device,
wherein the relationship information can be updated by said information processing terminal apparatus.

3. A data receiving system as claimed in claim 1, wherein the relationship information associates corresponding ones of the predetermined address, the at least one piece of the identification information on said output terminal apparatus, and at least one condition for output of received data with one another.

4. A data receiving system as claimed in claim 1, comprising a monitoring device that monitors an operating status of said output terminal apparatus, and
wherein said received data transfer device selects said predetermined output terminal apparatus based on the relationship information and the operating status of said output terminal apparatus monitored by said monitoring device.

5. A data receiving system as claimed in claim 1, wherein when said predetermined output terminal apparatus receives the received data from said received data transfer device and outputs the received data, said predetermined output terminal apparatus visibly displays or audibly outputs information indicating that the received data has been output.

6. A data receiving system as claimed in claim 1, wherein each of the at least one predetermined address is a host address generated based on an IP address automatic generation protocol and unique to each of at least one of said at least one output terminal apparatus, the at least one of said at least one output terminal apparatus being associated with the predetermined address, and said each of the at least one predetermined address being assigned to an output terminal apparatus user or an output terminal apparatus user group.

7. A data receiving system as claimed in claim 1, comprising a plurality of said output terminal apparatuses sharable by a plurality of output terminal apparatus users or a plurality of output terminal apparatus user groups, and
wherein the relationship information associates a plurality of the predetermined addresses assigned to the respective output terminal apparatus users or the respective output terminal apparatus user groups, with pieces of the identification information on said output terminal apparatuses.

8. A data receiving system as claimed in claim 7, wherein each of the output terminal apparatus users or the output terminal apparatus user groups can use at least two of said output terminal apparatuses, and
wherein the relationship information associates the predetermined addresses, pieces of the identification information on said output terminal apparatuses, and priorities in use assigned to the at least two of said output terminal apparatuses useable by each of the output terminal apparatus users or the output terminal apparatus user groups, with one another.

9. A data receiving apparatus that receives data addressed to one of at least one predetermined address, as received data through a communication network, comprising:
a relationship information-registering device that registers relationship information associating the at least one predetermined address with corresponding at least one piece of identification information on said at least one output terminal apparatus that receives the received data from the data receiving apparatus and outputs the received data; and a received data transfer device that selects at least a predetermined output terminal apparatus from said at least one output terminal apparatus based on the one of the at least one predetermined address to which the received data is addressed, and the relationship information, and then transfers the received data to said predetermined output terminal apparatus, wherein an information processing terminal apparatus associated with the predetermined address is connected to said predetermined output terminal apparatus, and wherein when said predetermined output terminal apparatus receives the received data from said received data transfer device and outputs the received data, said predetermined output terminal apparatus notifies said information processing terminal apparatus of identification information on said predetermined output terminal apparatus itself and information indicating that the received data has been output.

10. A data output method for a data receiving system comprising a data receiving apparatus that receives data addressed to one of at least one predetermined address, as received data through a communication network, and at least one output terminal apparatus that receives the received data from the data receiving apparatus and outputs the received data, comprising:

a relationship information registering step of registering relationship information associating the at least one predetermined address with corresponding at least one piece of identification information on the at least one output terminal apparatus; and a received data transfer step of selecting at least a predetermined output terminal apparatus from the at least one output terminal apparatus based on the one of the at least one predetermined address to which the received data is addressed, and the relationship information, and then transferring the received data to the predetermined output terminal apparatus, wherein an information processing terminal apparatus associated with the predetermined address is connected to the predetermined output terminal apparatus, and wherein when the predetermined output terminal apparatus receives the received data from the data receiving apparatus and outputs the received data, the predetermined output terminal apparatus notifies the information processing terminal apparatus of identification information on the predetermined output terminal apparatus itself and information indicating that the received data has been output.

11. A computer-readable medium storing a control program that when executed by a computer causes the computer to perform a data output method for a data receiving system comprising a data receiving apparatus that receives data addressed to one of at least one predetermined address, as received data through a communication network, and at least one output terminal apparatus that receives the received data from the data receiving apparatus and output the same, the data output method comprising:

a relationship information registering step of registering relationship information associating the at least one predetermined address with corresponding at least one piece of identification information on the at least one output terminal apparatus; and a received data transfer step of selecting at least a predetermined output terminal apparatus from the at least one output terminal apparatus based on the one of the at least one predetermined address to which the received data is addressed, and the relationship information, and then transferring the received data to the predetermined output terminal apparatus, wherein an information processing terminal apparatus associated with the predetermined address is connected to the predetermined output terminal apparatus, and when the predetermined output terminal apparatus receives the received data from the data receiving apparatus and outputs the received data, the predetermined output terminal apparatus notifies the information processing terminal apparatus of identification information on the predetermined output terminal apparatus itself and information indicating that the received data has been output.

* * * * *